United States Patent
Watanabe et al.

[11] Patent Number: 6,052,418
[45] Date of Patent: Apr. 18, 2000

[54] FREQUENCY ERROR MEASURING APPARATUS AND RADIO APPARATUS

[75] Inventors: Hidekazu Watanabe, Tokyo, Japan; Hamid Amir-Alikhani, Leonberg, Germany

[73] Assignees: Sony Corporation, Tokyo, Japan; Sony United Kingdom Limited, Weybridge, United Kingdom

[21] Appl. No.: 08/796,071

[22] Filed: Feb. 4, 1997

[30] Foreign Application Priority Data

Jan. 30, 1996 [GB] United Kingdom .................. 9601769

[51] Int. Cl.⁷ .............................. H04L 27/06; H04L 7/06
[52] U.S. Cl. ............................ 375/344; 375/364; 370/514
[58] Field of Search ..................... 375/326, 355, 375/343, 344, 362, 364, 365, 366, 219, 358, 367; 370/509, 514

[56] References Cited

U.S. PATENT DOCUMENTS

| | | | |
|---|---|---|---|
| 4,803,726 | 2/1989 | Levine et al. ............................ | 375/366 |
| 4,933,952 | 6/1990 | Albrieux et al. ........................ | 375/200 |
| 5,121,414 | 6/1992 | Levine et al. ........................... | 375/365 |
| 5,245,611 | 9/1993 | Ling et al. ............................... | 375/365 |
| 5,276,706 | 1/1994 | Critchlow ................................ | 375/343 |
| 5,282,227 | 1/1994 | Crawford ................................ | 375/326 |
| 5,365,549 | 11/1994 | Kazecki .................................. | 375/344 |
| 5,491,727 | 2/1996 | Petit ........................................ | 375/358 |
| 5,502,749 | 3/1996 | Ozaki ...................................... | 375/368 |
| 5,509,034 | 4/1996 | Beukema ................................ | 375/343 |
| 5,561,665 | 10/1996 | Matsuoka et al. ....................... | 375/344 |
| 5,598,429 | 1/1997 | Marshall ................................. | 375/367 |
| 5,717,722 | 2/1998 | Mori ........................................ | 375/326 |
| 5,787,128 | 7/1998 | Honkisz .................................. | 375/343 |
| 5,790,527 | 8/1998 | Janky et al. ............................. | 370/330 |

FOREIGN PATENT DOCUMENTS

| | | |
|---|---|---|
| 0 427 283 A2 | 11/1990 | European Pat. Off. . |
| 0 556 807 A2 | 2/1993 | European Pat. Off. . |
| 0 592 686 A1 | 4/1993 | European Pat. Off. . |
| 0 602 249 A1 | 6/1994 | European Pat. Off. . |
| 2 170 978 | 8/1986 | United Kingdom . |
| 2 251 161 | 6/1992 | United Kingdom . |
| 2 255 691 | 11/1992 | United Kingdom . |

*Primary Examiner*—Tesfaldet Bocure
*Attorney, Agent, or Firm*—Frommer Lawrence & Haug, LLP.; William S. Frommer

[57] ABSTRACT

In a radio apparatus of such as digital cellular which transmit and receive audio signals upon coded, the frequency error can be detected easily and certainly even in the environment of high noise level. The frequency error $\theta_e$ is detected according to the detection result of the complex correlation value between the synchronizing signal and the standard signal.

8 Claims, 4 Drawing Sheets

FREQUENCY ERROR MEASURING APPARATUS AND RADIO APPARATUS

BACKGROUND OF THE INVENTION

1. Field of Invention

This invention relates to a frequency error measuring apparatus, a radio apparatus and for example a digital cellular system for transmitting/receiving RF signals which include coded audio signals.

2. Description of the Related Art

Heretofore, in a digital cellular system, by using a coded audio signal, one channel is able to be used with a plurality of subscriber units at the same time by applying the method of time division multiple access system.

More specifically, when a radio wave arrives, this type of subscriber unit selects a channel having the strongest electromagnetic field after sequentially scanning, such as, 124 channels set in advance.

Then, the subscriber unit detects the control channel allocated to the area where this subscriber unit belongs and receives this control channel. The number of channels being able to be utilized in one cell is 124 in this system. The position of the control channel is not fixed in the 124 channels. Therefore, the apparatus of this systems scans sequentially all 124 channels, sorts these channels in the turn of strength of electromagnetic field, searches these channels to find frequency control channel (FCCH) signal in advance of sorted list, and determines whether channel is the control channel.

This control channel is used to establish a time slot and to transmit various information, and thus, the digital cellular system transmits information of the base station which receives this control channel from each subscriber unit and transmits, information of the adjacent base station, and furthermore, information to call out the subscriber unit.

Accordingly, the subscriber unit detects a frequency correction channel to be inserted to this control channel with the prescribed cycle and it adjusts processing timing based on this frequency control channel (FCCH), and simultaneously, roughly detects the timing of an existence of a necessary information.

The signal of the frequency control channel is the synchronizing signal which is allocated the bit pattern in order that the data with value "0" continues for the prescribed bit numbers when demodulated and in the digital cellular, this data is GMSK (Gaussian filtered Minimum Shift Keying) modulated and transmitted. Thus, as shown in FIG. 1, the signal of the frequency control channel signal can be expressed as composite waves of I signal and Q signal wherein their phase difference is 90° and their signal levels change sinusoidally.

With this arrangement, when the signal reception result obtained by orthogonal detection at the subscriber unit is sampled with the correct timing, the resultant I,Q data successively circulate on the I axis and Q axis of complex planes with 90° phase.

On the other hand, as shown in FIG. 2, if the frequency correction channel is received under the condition that the received frequency is not adjusted, the receiving data gradually shifts from I axis and Q axis corresponding to this frequency lag.

More specifically, this type of signal reception result can be expressed by vector. In the case of obtaining the signal reception result by sampling the signal reception result every successive bit (sampling is executed by 270 Kbps clock in the ASM system), if the frequency lag of this signal for the base station (i.e., clock delay in the subscriber unit) is expressed by $\theta_e$ (rad) and the sampled result of I,Q signal orthogonal detected in prescribed timing is expressed by vector $S_O$ ($\alpha_0 \beta_0$), and the signal reception result delayed by 4 samples is expressed by vector $S_4$ ($\alpha_4$, $\beta_4$), the following equations can be obtained by using the amplitude/angle expression:

$$r_0 \exp(j\theta_0) = \alpha_0 + j\beta_0 \quad (1)$$

$$r_4 \exp(j\theta_4) = \alpha_4 + j\beta_4 \quad (2)$$

The frequency error can be expressed as follows:

$$\theta_e = \theta_4 - \theta_0 \quad (3)$$

Accordingly, the following equation can be obtained from equations (1) and (2):

$$\begin{aligned}
\frac{r_4 \exp(j\theta_4)}{r_0 \exp(j\theta_0)} &= \frac{r_4}{r_0} \exp(j\theta_4 - j\theta_0) \\
&= \frac{r_4}{r_0} \exp(j\theta_e) \cdot \\
&= \frac{r_4}{r_0}(\cos\theta_e + j\sin\theta_e) \\
&\approx \cos\theta_e + j\sin\theta_e \\
&\quad (\because r_4 \approx r_o)
\end{aligned} \quad (4)$$

At this point, if the following relationship exists, $$\theta_e \ll 1 \quad (5)$$

the following formula can be obtained:

$$\sin\theta_e = \theta_e \quad (6)$$

If the imaginary part of equation (4) is solved, the frequency error $\theta_e$ can be detected.

More specifically, the following equation can be obtained from equation (4):

$$\begin{aligned}
\theta_e &= \text{Im}\left(\frac{r_4 \exp(j\theta_4)}{r_0 \exp(j\theta_0)}\right) \\
&= \text{Im}\left(\frac{\alpha_4 + j\beta_4}{\alpha_0 + j\beta_0}\right) \\
&= \text{Im}\left(\frac{(\alpha_4 + j\beta_4)(\alpha_0 - j\beta_0)}{\alpha_0^2 + \beta_0^2}\right) \\
&= \text{Im}\left(\frac{\alpha_4\alpha_0 + \beta_4\beta_0 + j(\alpha_0\beta_4 - \alpha_4\beta_0)}{\alpha_0^2 + \beta_0^2}\right) \\
&= \frac{\alpha_0\beta_4 - \alpha_4\beta_0}{\alpha_0^2 + \beta_0^2}
\end{aligned} \quad (7)$$

Thus, in the subscriber unit, the frequency error can be detected by executing calculation processing of equation (7) based on the signal reception result. In the actual subscriber unit, the frequency error $\theta_e$ will be detected with average processing in order to eliminate the effect of noise.

More specifically, since the amplitude of the signal reception result does not change much within one slot, the frequency error $\theta_e$ will be detected by executing the calculation processing of the following equation in the subscriber unit:

$$\theta_e = \frac{1}{128} \sum_{k=0}^{127} \frac{\alpha_k \beta_{k+4} - \alpha_{k+4} \beta_k}{\alpha_k^2 + \beta_k^2} \qquad (8)$$

In this case, since the frequency error $\theta_e$ comprises angle error of every 4 bit, the received signal circulates a greater number of times in the I,Q plane per second as defined in the following equation:

$$\theta_e \times \frac{RBIT}{4} \text{(rad)} \qquad (9)$$

where $R_{BIT}$ is bit rate.

In this case, since bit rate is approximately 270.8 [Kbps] (13M bps/48) in the subscriber unit of the digital cellular system, the actual frequency error $f_e$ can be expressed as follows:

$$\begin{aligned} f_e &= \theta_e \times \frac{13 \times 10^6}{48} \times \frac{1}{4} \times \frac{1}{2\pi} \\ &= \frac{13 \times 10^6}{384\pi} \theta_e \\ &= 10.8 \times 10^3 \theta_e \end{aligned} \qquad (10)$$

Thus, the subscriber unit is capable of detecting frequency error $\theta_e$ and in practice, the processing procedure as shown in FIG. 3, is executed and the frequency deviation will be corrected.

More, specifically, the subscriber unit sequentially scans 124 channels which are set in advance. When the signal in the control channel allocated to the area where the subscriber unit belongs is received, the subscriber unit operates a step SP2 in FIG. 3 and it detects the correlation value sequentially between the input data comprising the reception result of the control channel and the prescribed reference signal.

Since the reference signal is defined as the identical with the signal of the frequency correction channel, the subscriber unit detects the timing of the signal of the frequency correction channel by detecting the rising of a correlation value.

Accordingly, when the subscriber unit detects the timing of the signal of the frequency correction channel, it stores the reception result of the frequency correction channel into the memory circuit by storing the I,Q data to be received with this timing in the prescribed memory circuit, and in the following step SP3 of FIG. 3, it executes the calculation process of equation (8) in utilizing I,Q data stored in this memory circuit.

With this arrangement, after detecting the frequency error $\theta_e$ the subscriber unit operates the step SP4 of FIG. 3 and corrects the clock frequency by correcting the oscillation frequency in the reference signal generation circuit based on the detection result of the frequency error $\theta_e$. By operating the step SP5, it completes the processing procedure.

In practice, in the case that the subscriber unit is used in an environment with a bad receiving condition of the signal especially in mobile communications, a waveform distortion sometimes occurs in the received signal by noise and fading. Moreover, sometimes a carrier frequency of the received signal is displaced by the Doppler shift.

Therefore, in the conventional subscriber unit it has been difficult to detect the frequency of the frequency correction channel correctly due to kind of outside disturbance.

Especially, the conventional subscriber unit $E_b/N_o=$ 15[dB] is the limit of a capability of the frequency error detection according to the simulation result. ($E_b$ is a communicated energy by one bit. $N_o$ is a power density of noise. $E_b/N_o$ is a common expression for expressing a state of a communication medium). It is clear that the frequency error cannot be detected practically if the noise level increases further.

However, in the practical application, a noise level increases more than this value. Sometimes it is necessary to receive the frequency correction channel repeatedly in the subscriber unit, and thus it takes time to start a communication.

SUMMARY OF THE INVENTION

In view of the foregoing, an object of this invention is to provide a frequency error measuring apparatus and a radio apparatus which are capable of detecting the frequency error correctly and certainly even in the environment of high noise level.

The foregoing object and other objects of this invention have been achieved by the provision of a frequency error measuring apparatus wherein, transmission signal is received based on the synchronizing signal (FCCH) of the prescribed pattern to be inserted to the transmission signal with the prescribed cycle, and in a frequency error measuring apparatus for detecting the frequency deviation $\theta_e$ of a clock for the synchronizing signal (FCCH), the reference pattern for the correlation detection will be formed based on the clock, the complex correlation value $C_{ORR}$ between the reference pattern and the transmission signal will be detected, and the frequency deviation $\theta_e$ of the clock for the synchronising signal (FCCH) will be detected based on the complex correlation value $C_{ORR}$.

Furthermore, according to the invention, in a radio apparatus for receiving transmission signals based on synchronising signal (FCCH) of the prescribed pattern to be inserted to transmission signals with the prescribed cycle, the reference pattern for correlation value detection will be formed based on the prescribed clock and complex correlation value $C_{ORR}$ between the reference pattern and transmission signal will be detected, and the reference pattern formation frequency error $\theta_e$ for the synchronizing signal (FCCH) will be detected based on the complex correlation value $C_{ORR}$, and based on this frequency error $\theta_e$, the signal reception result to be obtained when the reference pattern formation frequency coincides with the synchronizing signal (FCCH).

According to this invention as described above, since the frequency error can be detected based on the detection result of the correlation value between the synchronizing signal and the reference signal, the frequency error measuring apparatus and the radio apparatus capable of detecting the frequency error can be obtained easily and certainly.

In the conventional subscriber units, in the case that data are distorted by fading and noise, it cannot receive data correctly. Therefore, a frequency error which is calculated from received data becomes bad. In this invention, a correlate calculation is regarded as an average procedure itself, and further, an average operation is executed after the correlate calculation is executed. After all, the average operation of the data is executed twice and an accurate result is obtainable.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Construction of Embodiment

Figure 1:
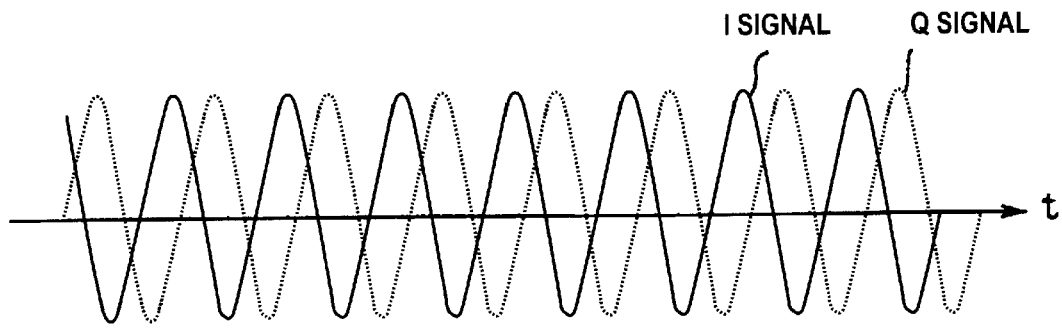
FIG. 1 is a waveform diagram illustrating a frequency correction channel.
Figure 3:
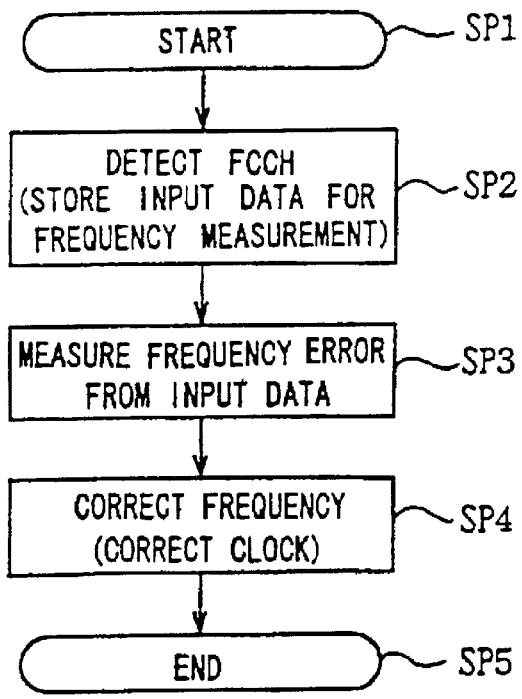
FIG. 3 is a flowchart illustrating the frequency correction channel.
Figure 2:
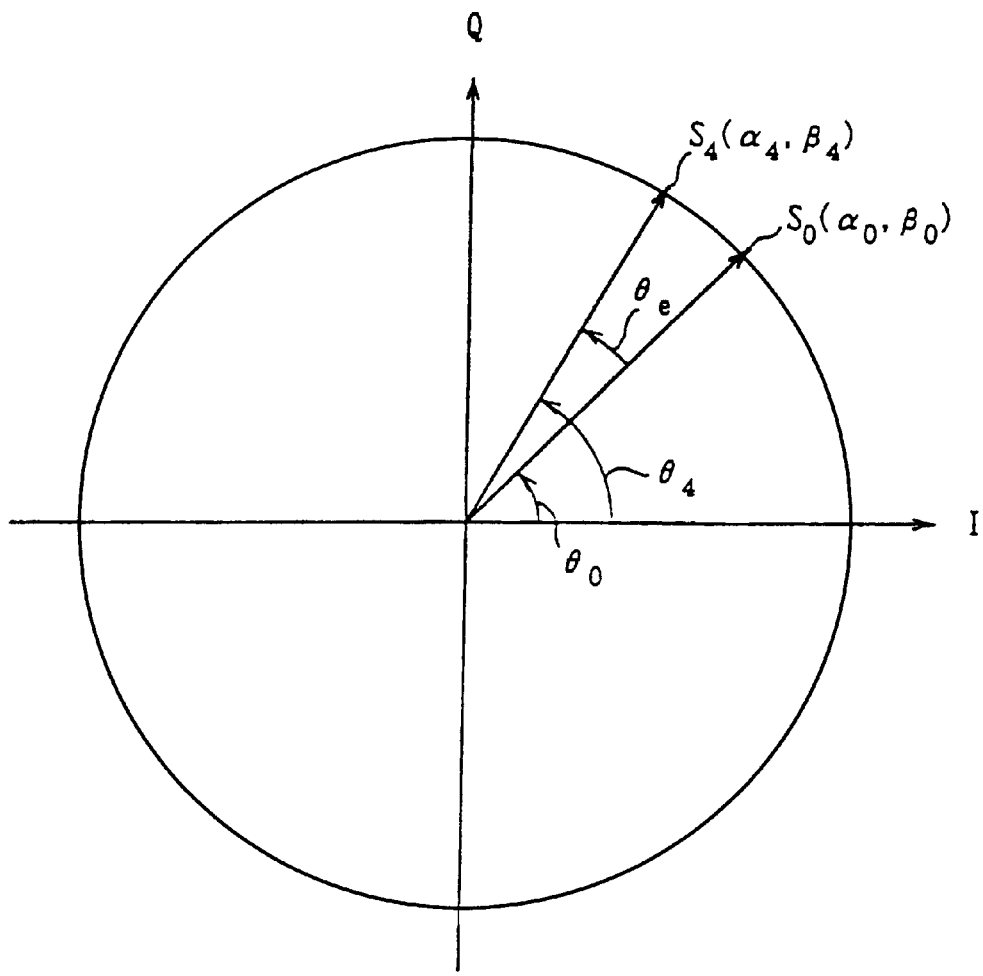
FIG. 2 is a brief linear diagram illustrating frequency error.
Figure 4:
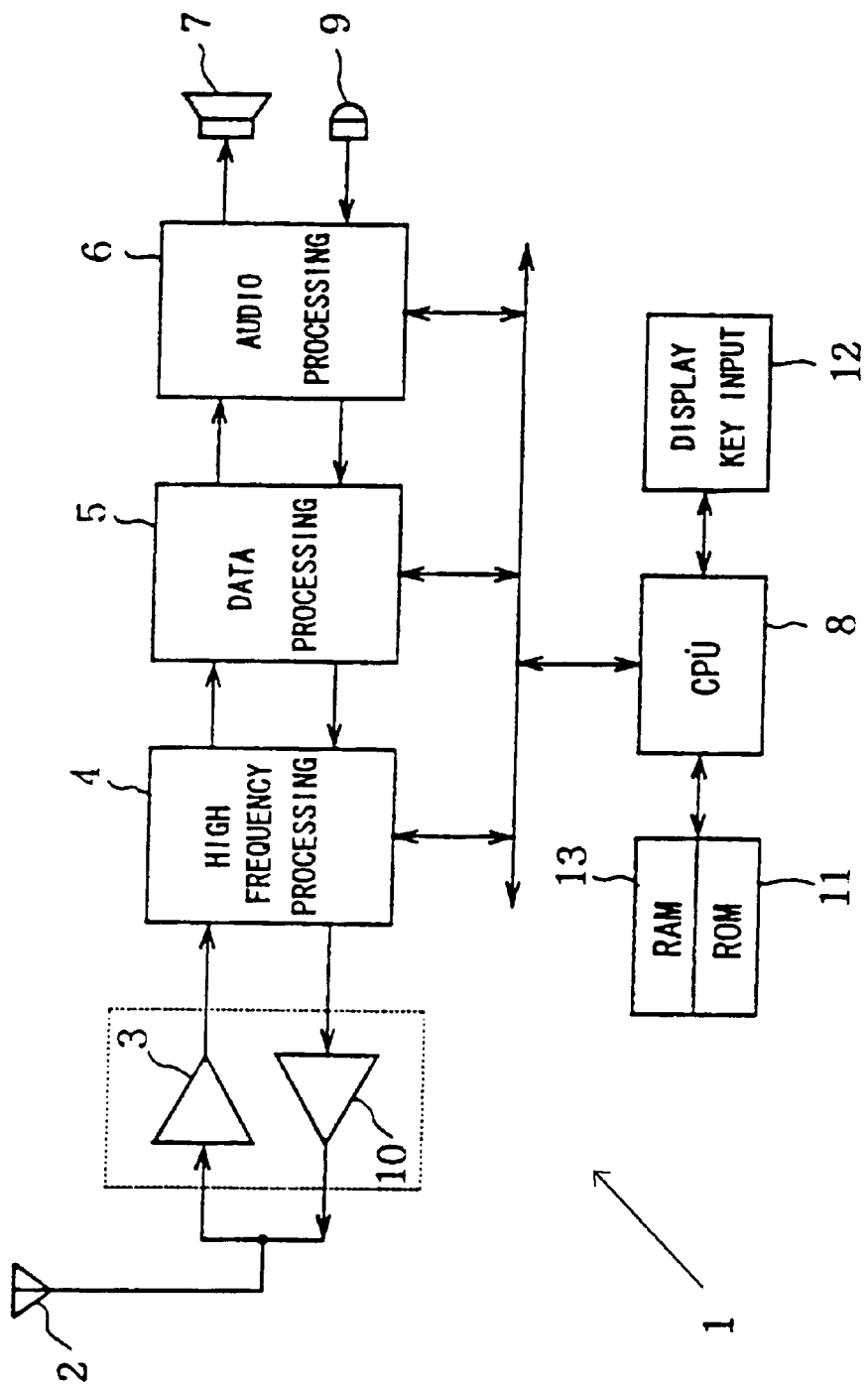
FIG. 4 is a block diagram illustrating a terminal equipment of digital cellular according to the embodiment of this invention.

In FIG. 4, 1 is a subscriber unit of digital cellular system which receives signals transmitted from the base station by an antenna 2 and supplies the received signals received to an amplifier 3 through a duplexer (not shown).

The amplifier 3 supplies the signals received after amplifying with the prescribed gain to a radio frequency signal processing circuit (RF process) 4 which performs frequency conversion on the signal received using the prescribed local oscillated signal. Thus, the subscriber unit 1 can receive the desired channel selectively by shifting the frequency of local oscillated signal.

Furthermore, the radio frequency processing circuit 4 demodulates I signal synchronized with a phase reference of the received signal by an orthogonal detection the frequency converted received signal.

Simultaneously, it demodulates Q signal of which phase is 90° different from the I signal and converts these I signal and Q signal to digital value by the built-in analog-to-digital converter. (I data and Q data are digital signal with plural bits A/D converted each sample of I and Q signal respectively).

In this arrangement, the subscriber unit 1 is capable of demodulating the I data composed of the demodulation result synchronized with the phase reference of the signal received and is able to demodulate the Q data composed of the demodulation result having 90° different phase from I data, and thus, is able to demodulate I data and Q data which are modulated in GMSK.

In this embodiment, data is divided to I and Q data but it is not essential to divide to I and Q for a GMSK format. In MSK (including GMSK) format, I and Q signal have no meaning itself. Phase transition expresses an information in essential in MSK format.

Quantity of the phase transition in MSK is 90°, but it is not limited to 90° in GMSK format.

A data processing circuit 5 is formed of a digital signal processor for processing these I data and Q data. By equalizing waveforms of I data and Q data and compensating the signal distortion, it eliminates the effects of fading and multipath.

Furthermore, the data processing circuit 5 detects a signal of the frequency correction channel referred to these I data and Q data and simultaneously, it detects the frequency error based upon the detected result thereof. At the same time, based on said detection result, functions of this data processing circuit 5 and the prescribed reference signal generation circuit, etc. are able to be controlled, so that, the frequency error is compensated.

In addition to this series of processing, after convolution decoding the I data and Q data, the data processing circuit 5 processes the error correction and generates the resultant decoded data to an audio processing circuit 6 or a central processing unit 8 selectively.

The audio processing circuit 6 expands the decoded data for audio data, demodulates the audio data and converts this audio data to an analog audio signal at the built-in digital-to-analog converter. Furthermore, the audio processing circuit 6 drives a speaker 7 by this audio signal and thus, in the subscriber unit 1, an audio signal included in a signal generated from the base station can be received.

On the other hand, the central processing unit (CPU) 8 interprets the prescribed information included in the received signal generated from the base station. Depending upon the decoded data included in the received signal, it changes the frequency of a local oscillation signal and thus, it changes the transmission and reception frequency to the prescribed communication channel. So, the subscriber unit 1 is able to transmit and receive audio signals included in the RF signal by using the selected prescribed communication channel.

On the other hand, after converting an analog audio signal from a microphone 9 to the digital audio data at the audio processing circuit 6, a transmission section in the subscriber unit 1 performs audio compression process.

The data processing circuit 5 generates I and Q data by convolution coding the output data of this audio processing circuit 6 and also generates I and Q data by convolution coding various control codes generated from the central processing unit 8 in place of the output data of this audio processing circuit 6.

The RF processing circuit 4 generates I and Q signals upon GMSK modulating I and Q data, and by combining these I and Q signals it generates a transmission signal in the prescribed frequency.

Furthermore, the RF processing circuit 4 supplies this frequency converted transmission signal to the antenna 2 through an amplifier 10. Thus, in the subscriber unit 1 audio signals of the communicator or signals to call out the base station can be transmitted.

The subscriber unit 1 changes over the timing of transmission and reception based on the predetermined timing detection result detected at the data processing circuit 5. By applying the method of time division multiplex, it receives selectively the time slot allocated to itself in the transmission signal to be transmitted to a plurality of subscriber units from the base station. It also transmits signals to the base station utilising the time slot allocated to itself.

Hence, the central processing unit (CPU) 8 executes a program stored in a read only memory circuit (ROM) 11 with obtaining the work area in a random access memory circuit (RAM) 13, and it controls the entire functions of the subscriber unit 1 by supplying the control codes to each circuit block as occasion demands. For example, if the prescribed operation key of a display key input unit 12 is pressed, call out signal is generated to the base station corresponding to this operation. Moreover, if call out signal from the base station is received, receiving channels will be changed to the predetermined channel.

(2) Correction of Frequency Error

The subscriber unit 1 firstly executes the frame synchronization based on the signal of the frequency correction channel upon receiving the control channel and furthermore, by detecting frequency error and correcting frequency deviation, it synchronizes the entire functions with the timing of the received data based on the prescribed burst, and it receives the time slot and the desired information.

More specifically, if the power source is started or the area to which the terminal equipment belongs is changed, the central processing unit 8 generates the control code to the RF processing circuit 4 and receives the control channel, and then generates the control code to the data processing circuit 5 and detects the signal of the frequency correction channel.

In this arrangement, after detecting the frequency correction channel timing, the central processing unit 8 sets the time base counter built-in data processing circuit 5 based on this timing and it operates the frame synchronization on the entire operations.

The data processing circuit 5 detects a timing of the signal of the frequency correction channel by computing the correlation value between the waveform of the reference signal and the received signal and detecting the rising timing of the correlation value signal.

More specifically, the data processing circuit 5 judges that the signal of the frequency correction channel is received if the relationship of the following equation exists and it detects the rising of the correlation value signal. It detects the timing of the signal of the frequency correction channel timing: where power of detected correlation value is $P_{CORR}$, a power of received signal is $P_{REC}$ and a threshold value is $T_H$;

$$P_{REC} - P_{CORR} \times T_H \leq 0 \tag{11}$$

Here, by using $I_m$ and $Q_m$ (sample$_m$) for I and Q data respectively, template value is expressed as complex conjugate numbers $T_{im}$ and $T_{qm}$ (template$_m$) and the length of correlation is n, the intermediate value $C_m$ for calculation is expressed as follows:

$$\begin{aligned} C_m &= sample_m * template_m \\ &= (I_m + jQ_m)(T_{im} - jT_m) \\ &= (I_m T_{im} + Q_m T_{qm}) + j(Q_m T_{im} - I_m T_{qm}) \end{aligned} \tag{12}$$

The data processing circuit 5 detects the complex correlation value $C_{ORR}$ by executing the following equation:

$$C_{ORRk} = \sum_{m=k}^{k+n+1} C_m \tag{13}$$

More specifically, FCCH is detected by formula (11). Comparing the power of detected correlation value $P_{CORR}$ and the power of received signal $P_{REC}$ (with regards to threshold value $T_H$), when $P_{CORR}$ is greater, then it is regarded that FCCH is detected.

Thus, the intermediate value $C_m$ detected as complex numbers is obtained by multiplying the received signal and conjugate numbers of the complex number. In the case that the received signal is expressed on the I,Q plane by 1 bit, the received signal rotates on this plane counter clockwise by each 90°.

Then, if the frequency error is O, the intermediate value $C_m$ stays in the same plane on the complex plane during the period of receiving the signal of the frequency correction channel. On the other hand, if the frequency error exists, it rotates on the complex plane during the period of receiving the signal of the frequency correction channel.

By calculating formula (12), the received signal rotates by each 90°, because a signal of the complex conjugate number of the template rotates clockwise by each 90° per one bit. Therefore, these are the same positions in a complex plane in each one sample.

More specifically, if the intermediate value $C_m$ is detected in the form of complex numbers as in this embodiment, information about the frequency error can be obtained.

Furthermore, since this correlation value $C_{CORR}$ is processed in average the intermediate value $C_m$ in equation (13), the effect of noise has been decreased. Sum $\Sigma$ means a sort of an average.

Thus, the frequency error can be detected based on the correlation value $C_{ORR}$, and it is clear that the effect of noise is able to be decreased in this case.

In practice, in the digital cellular system of this embodiment, if the frequency error cannot be detected based on the I and Q data because of high noise level, (e.g., in the case of En/No=0 [dB]), the frequency correction channel can be detected from the correlation value $C_{ORR}$.

Furthermore, if the frequency error is detected based on this correlation value $C_{ORR}$, the frequency error is detectable by utilizing the frequency correction channel timing detection result. Thus, the necessary processing, such as repetition of receiving and demodulating the signal of the frequency correction channel, can be omitted.

Accordingly, the entire operation of the receiver can be synchronized with the base station in a short time and a communication-ready condition can be established in a short period.

Thus, during the period of receiving the signal of the frequency correction channel, the data processing circuit 5 sequentially expresses the correlation value $C_{ORR}$ obtained from equation (13) as follows:

$$C_{ORRK} = \gamma_k + J\delta_k \tag{14}$$

It executes the following calculation and averages the averaged correlation value $C_{ORRk}$ more. It detects frequency error $\theta_e$:

$$\theta_e = \frac{1}{128} \sum_{k=0}^{127} \frac{\gamma_k \delta_{k+1} - \gamma_{k+1} \delta_k}{\gamma_k^2 + \delta_k^2} \tag{15}$$

Figure 5:
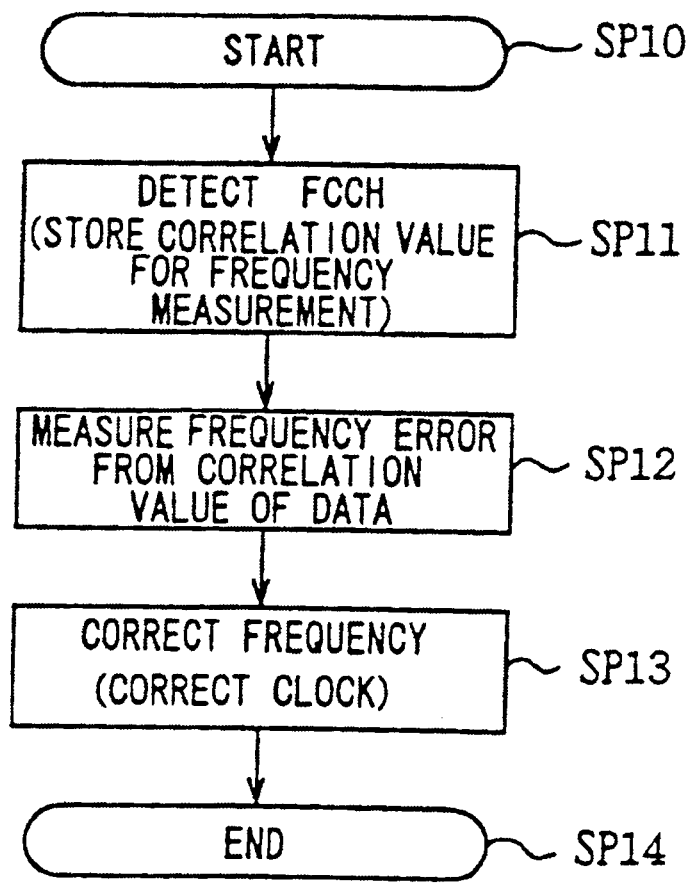
FIG. 5 is a flowchart illustrating the frequency deviation correction.

The central processing unit 8 corrects the frequency deviation by performing a procedure as shown in FIG. 5.

More specifically, the central processing unit 8 at a step SP11 detects the signal of the frequency correction channel by detecting the correlation value after supplying the control code to the data processing circuit S. It detects the frequency error in the following step SP12 by executing the calculation of equation (15) from this correlation value.

In this arrangement, the central processing unit 8 generates the control code to the prescribed reference signal generation circuit composed of synthesizer, and changes the frequency of this generation circuit in the following step SP13, and thus corrects the frequency deviation by correcting the clock frequency and completes the procedure at the following step SP14.

Thus, it is confirmed in the simulation that the frequency error is able to be detected even in the case where the noise level and the signal level are equal if the frequency error would be detected based on the correlation value.

(3) Effects of the Embodiment

According to the foregoing construction, since the signal of the frequency correction channel is detected by detecting the correlation value in the form of complex numbers and, the frequency error is detected based on this correlation value, the frequency error can be detected and frequency deviation can be corrected easily and accurately even in the case of high noise level.

(4) Other Embodiments

With the embodiment described above, the frequency deviation is corrected by correction of the frequency of the clock. In an alternative embodiment, the data is received without correction of the clock frequency and the frequency deviation is corrected by correction of the phase of the received data (This method is possible only in the case that the frequency error is small).

In this case, a quantity of a phase correction at the nth bit per one bit $\theta_{en}$ is described by the following equation, where a measured phase error is $\theta_e$.

$$\theta_{en} = \theta_e \times (n-1)$$

Therefore, formula (16) may be rewritten as the next formula.

$$\begin{bmatrix} \varepsilon'_n \\ \zeta'_n \end{bmatrix} = \begin{bmatrix} \cos\theta_{en} & -\sin\theta_{en} \\ \sin\theta_{en} & \cos\theta_{en} \end{bmatrix} \begin{bmatrix} \varepsilon_n \\ \zeta_n \end{bmatrix} \quad (16)$$

Furthermore, the embodiment described above has dealt with the case of correcting frequency errors by applying this invention to the digital cellular system.

However, this invention is not only limited to the above, but also widely applicable to the radio apparatuses for receiving the signal based on the synchronizing signal to be inserted with the prescribed cycle, and further applicable to the case of only measuring the frequency error.

While there has been described in connection with the preferred embodiments of this invention, it will be obvious to those skilled in the art that various changes and modifications may be aimed, therefore, to cover in the appended claims all such changes and modifications as fall within the true spirit and scope of this invention.

We claim:

1. A frequency error measuring method for detecting frequency deviation between a reference clock frequency and a frequency of a receive signal having a prescribed pattern contained therein, comprising the steps of:

forming a standard pattern for a correlation value detection based on said clock;

correlating the receive signal with the standard pattern so as to detect, for each of a plurality of sequential portions of said receive signal, a complex correlation value $C_{ORRk}$ between said standard pattern and the respective sequential portion of said receive signal, where $C_{ORRk}$ is associated with a kth sample of said receive signal;

detecting the prescribed pattern by determining a power $P_{REC}$ associated with the receive signal and a power $P_{CORR}$ associated with the correlation value, with said prescribed pattern being detected when a predetermined relationship between $P_{REC}$, $P_{CORR}$ and a threshold value $T_H$ is satisfied; and computing a frequency deviation between said clock frequency and said receive signal frequency by performing an averaging operation on a sequence of said complex correlation values $C_{ORR}$;

wherein said predetermined relationship between $P_{REC}$, $P_{CORR}$ and $T_H$ is:

$$P_{REC} - P_{CORR} \times T_H \leq 0.$$

2. The method of claim 1 wherein said averaging operation computes said frequency deviation $\theta_e$ in accordance with the following equation:

$$\theta_e = (1/N) \sum_{k=0}^{N-1} \frac{\gamma_k \delta_{k+1} - \gamma_{k+1} \delta_k}{\gamma_k^2 + \delta_k^2}$$

where k is a sample point of said receive signal, N is an integer, $\gamma_k$ is a real component of $C_{ORRk}$, and $\delta_k$ is an imaginary component of $C_{ORRk}$.

3. The method of claim 2 wherein N equals 128.

4. The method of claim 1 wherein the prescribed pattern is an FCCH pattern of a time division multiple access system.

5. The method of claim 1, further comprising the step of correcting said clock frequency based on the detected frequency deviation.

6. An apparatus for measuring frequency deviation between a reference clock frequency and a frequency of a receive signal having a prescribed pattern contained therein, comprising:

means for forming a standard pattern for a correlation value detection based on said clock;

complex correlation means for correlating the receive signal with the standard pattern so as to detect, for each of a plurality of sequential portions of said receive signal, a complex correlation value $C_{ORRk}$ between said standard pattern and the respective sequential portion of said receive signal, where $C_{ORRk}$ is associated with a kth sample of said receive signal;

detecting means for detecting the prescribed pattern by determining a power $P_{REC}$ associated with the receive signal and a power $P_{CORR}$ associated with the correlation value, with said prescribed pattern being detected when a predetermined relationship between $P_{REC}$, $P_{CORR}$ and a threshold value $T_H$ is satisfied; and means for computing a frequency deviation between said clock frequency and said receive signal frequency by performing an averaging operation on a sequence of said complex correlation values $C_{ORRk}$;

wherein said predetermined relationship between $P_{REC}$, $P_{CORR}$ and $T_H$ is:

$$P_{REC} - P_{CORR} \times T_H \leq 0.$$

7. The apparatus of claim 6 wherein said averaging operation computes said frequency deviation $\theta_e$ in accordance with the following equation:

$$\theta_e = (1/N) \sum_{k=0}^{N-1} \frac{\gamma_k \delta_{k+1} - \gamma_{k+1} \delta_k}{\gamma_k^2 + \delta_k^2}$$

where k is a sample point of said receive signal, N is an integer, $\gamma_k$ is a real component of $C_{ORRk}$, and $\delta_k$ is an imaginary component of $C_{ORRk}$.

8. The apparatus of claim 6, further comprising means for correcting said clock frequency based on the detected frequency deviation.

* * * * *